(12) United States Patent
Tirca et al.

(10) Patent No.: US 11,174,849 B2
(45) Date of Patent: Nov. 16, 2021

(54) HYSTERESIS MANIPULATION OF SMA OR NTE MATERIAL FOR USE IN AN ENERGY RECOVERY DEVICE

(71) Applicant: Exergyn Limited, Dublin (IE)

(72) Inventors: Georgiana Tirca, Dublin (IE); Kevin O'Toole, Dublin (IE)

(73) Assignee: Exergyn Limited, Dublin (IE)

( * ) Notice: Subject to any disclaimer, the term of this patent is extended or adjusted under 35 U.S.C. 154(b) by 34 days.

(21) Appl. No.: 16/623,040

(22) PCT Filed: Jun. 14, 2018

(86) PCT No.: PCT/EP2018/065897
§ 371 (c)(1),
(2) Date: Dec. 16, 2019

(87) PCT Pub. No.: WO2018/229233
PCT Pub. Date: Dec. 20, 2018

(65) Prior Publication Data
US 2021/0148340 A1    May 20, 2021

(30) Foreign Application Priority Data
Jun. 16, 2017  (GB) .................................... 1709601

(51) Int. Cl.
*F03G 7/06* (2006.01)
(52) U.S. Cl.
CPC .................................. *F03G 7/065* (2013.01)
(58) Field of Classification Search
CPC ............ F03G 7/065; G01K 5/483; G12B 1/00

USPC ................................................... 60/526–528
See application file for complete search history.

(56) References Cited

U.S. PATENT DOCUMENTS

| 4,086,769 A * | 5/1978 | Smith | F03G 7/065 |
| | | | 60/527 |
| 2010/0243077 A1* | 9/2010 | Grimseth | E21B 34/00 |
| | | | 137/468 |
| 2010/0296183 A1* | 11/2010 | Honda | F03G 7/065 |
| | | | 359/823 |
| 2011/0179790 A1* | 7/2011 | Pretorius | F03G 7/065 |
| | | | 60/641.15 |
| 2018/0266400 A1* | 9/2018 | Gurley | G05B 21/00 |

FOREIGN PATENT DOCUMENTS

| CA | 2800923 | 12/2011 | |
| EP | 2237093 | 10/2010 | |
| WO | WO 2010/019554 | 2/2010 | |
| WO | WO 2016/097214 | 6/2016 | |
| WO | WO-2016097214 A1 * | 6/2016 | ............. F03G 7/065 |

* cited by examiner

*Primary Examiner* — Shafiq Mian
(74) *Attorney, Agent, or Firm* — Occhiuti & Rohlicek LLP

(57) ABSTRACT

The application discloses an energy recovery device comprising a drive mechanism; an engine core comprising a plurality of Shape Memory Alloy (SMA) elements or Negative Thermal Expansion (NTE) elements fixed at a first end and connected at a second end to the drive mechanism. A block mechanism is positioned between the engine core and the drive mechanism to restrict movement of the drive mechanism until the elements reach a desired temperature.

9 Claims, 8 Drawing Sheets

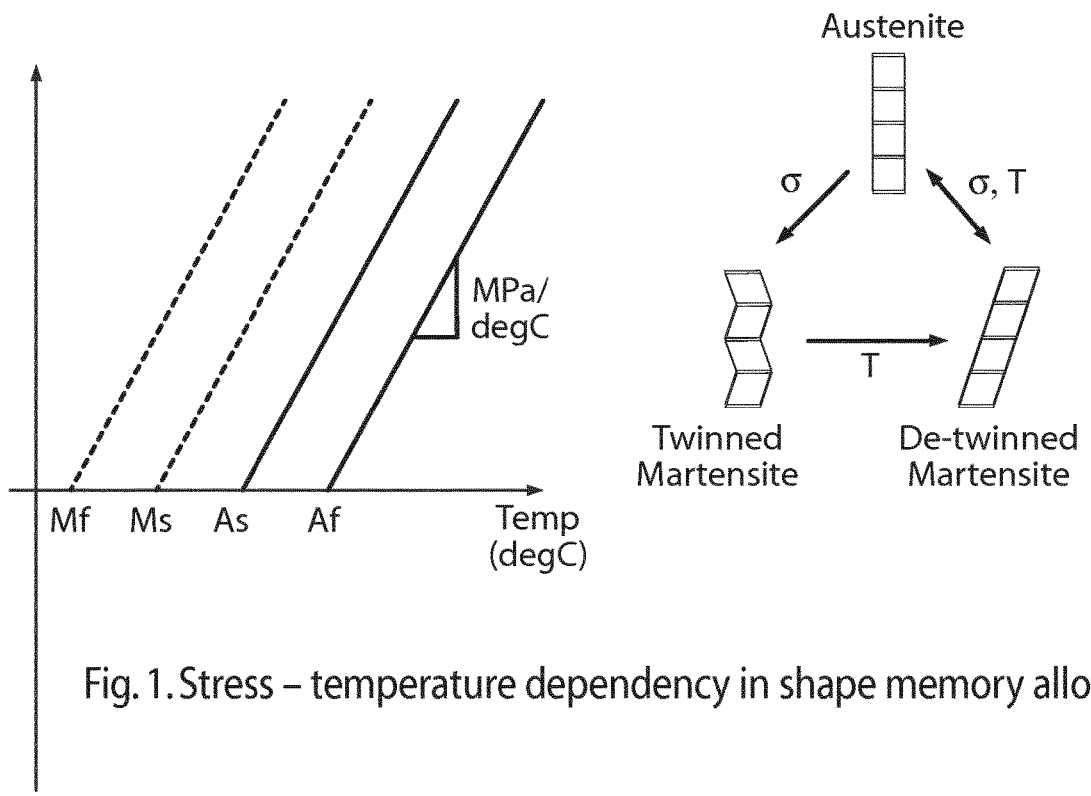
Fig. 1. Stress – temperature dependency in shape memory alloys
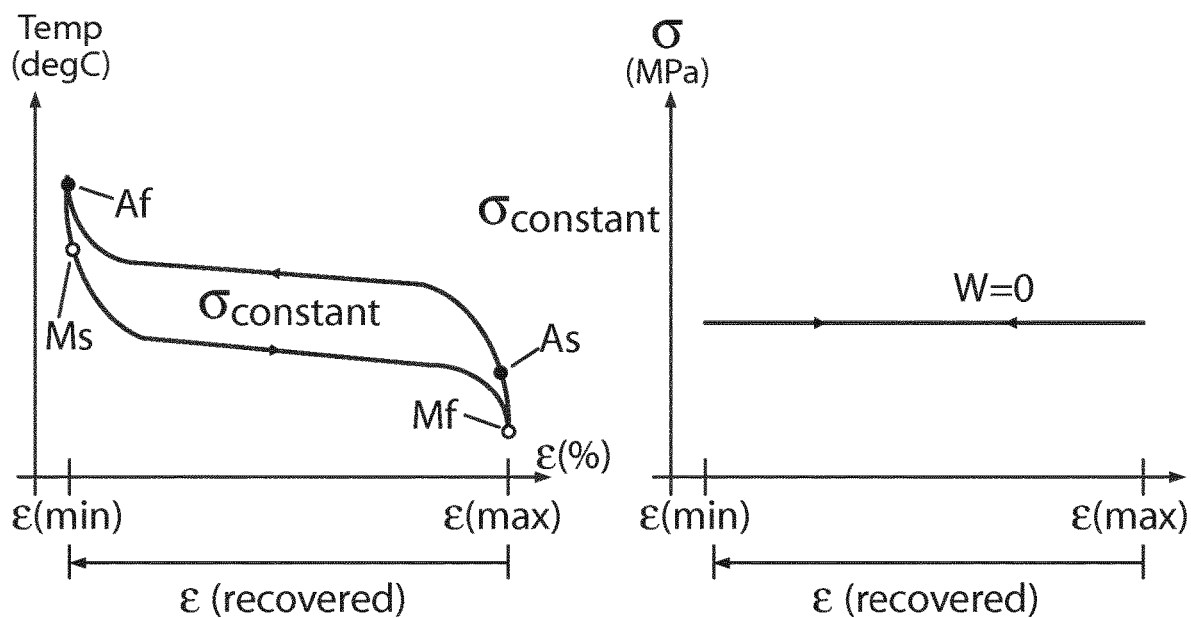
Fig. 2. Hysteresis loop at constant stress

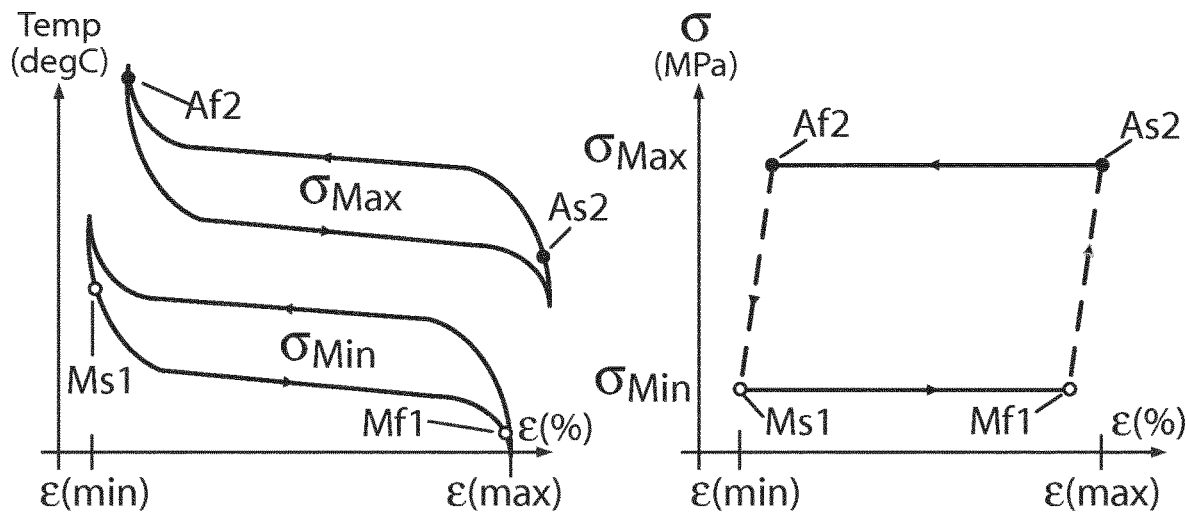
Fig. 3. Hysteresis loops at two different stresses
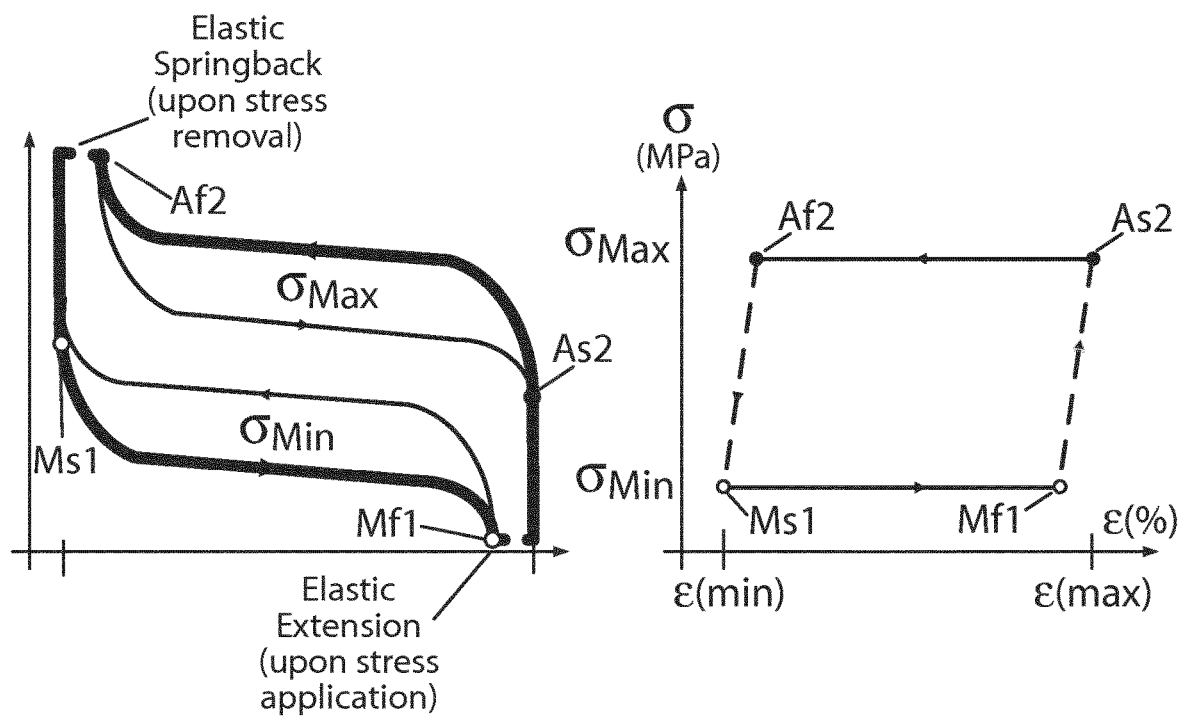
Fig. 4. Resultant work cycle for the Exergyn Drive in dual load

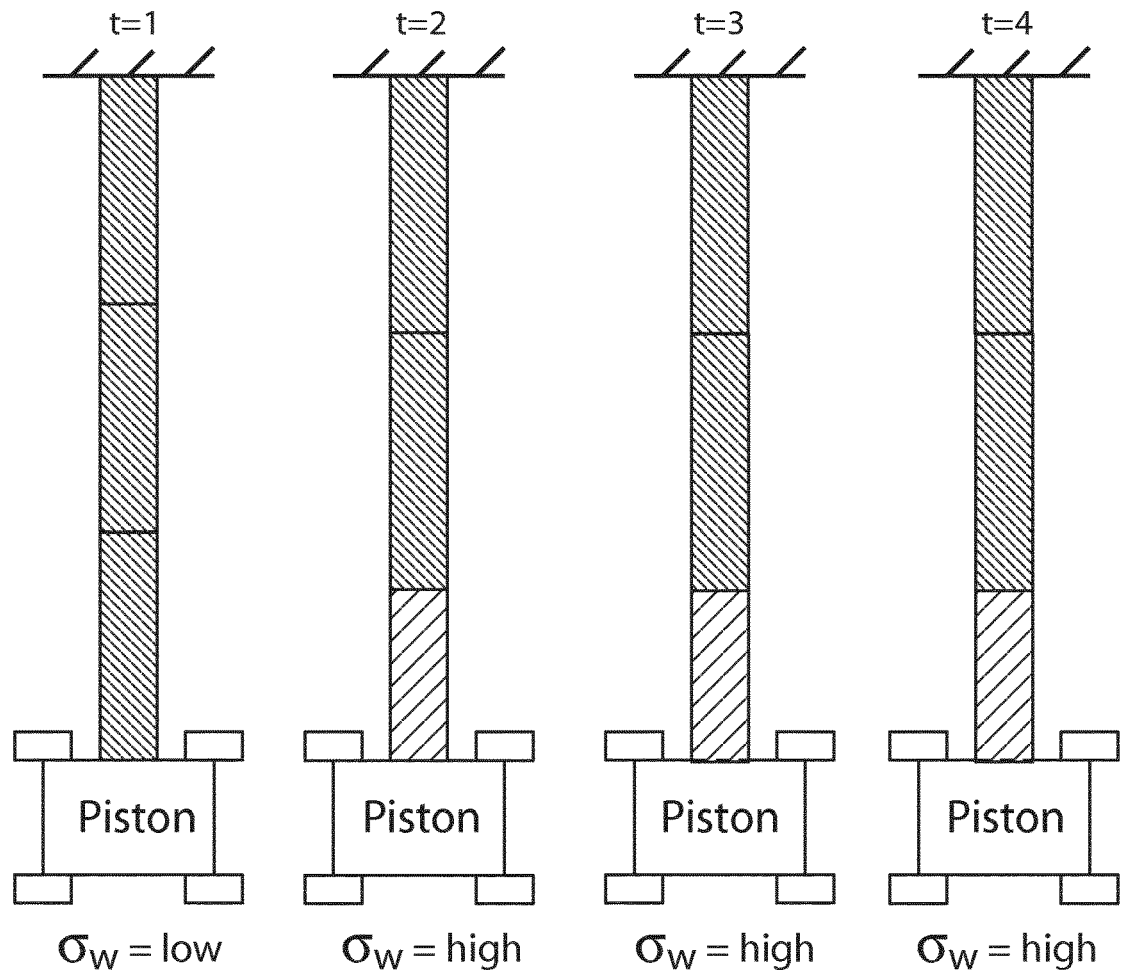
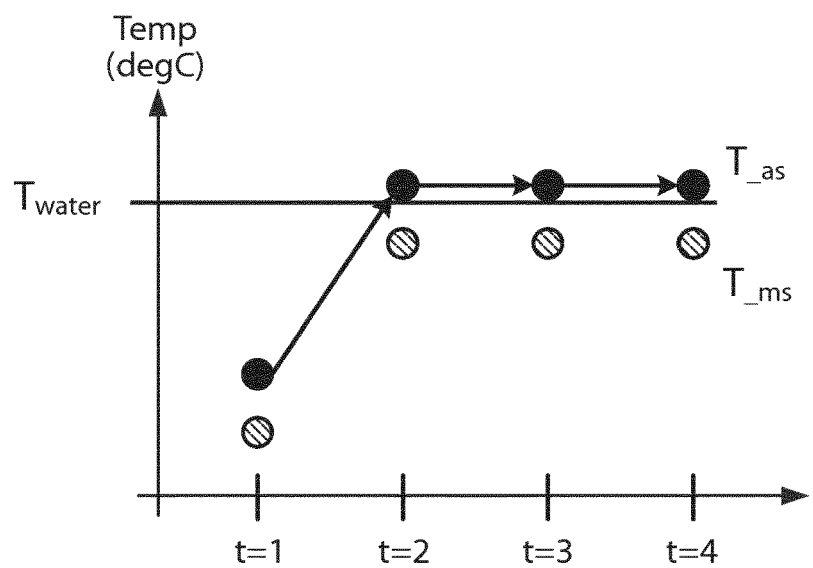
Figure 8

HYSTERESIS MANIPULATION OF SMA OR NTE MATERIAL FOR USE IN AN ENERGY RECOVERY DEVICE

CROSS REFERENCE TO RELATED APPLICATION

This application is the national phase under 35 USC 371 of international application no. PCT/EP2018/065897, filed Jun. 14, 2018, which claims the benefit of the Jun. 16, 2017 priority date of British application no. 1709601.7.

FIELD

The present application relates to the field of energy recovery and in particular to the use of Shape-Memory Alloys (SMAs) or Negative Thermal Expansion (NTE) materials.

BACKGROUND

Low grade heat, which is typically considered less than 100 degrees, represents a significant waste energy stream in industrial processes, power generation and transport applications. Recovery and re-use of such waste streams is desirable. An example of a technology which has been proposed for this purpose is a Thermoelectric Generator (TEG). Unfortunately, TEGs are relatively expensive. Another largely experimental approach that has been proposed to recover such energy employs Shape-Memory Alloys.

A Shape-Memory Alloy (SMA) is an alloy that "remembers" its original, cold-forged shape which, once deformed, returns to its pre-deformed shape upon heating. This material is a lightweight, solid-state alternative to conventional actuators such as hydraulic, pneumatic, and motor-based systems.

The three main types of Shape-Memory Alloys are the copper-zinc-aluminium-nickel, copper-aluminium-nickel, and nickel-titanium (NiTi) alloys but SMAs can also be created, for example, by alloying zinc, copper, gold and iron. The list is non-exhaustive.

The memory of such materials has been employed or proposed since the early 1970s for use in heat recovery processes and in particular by constructing SMA engines which recover energy from heat as motion. Recent publications relating to energy recovery devices include PCT Patent Publication number WO2013/087490, assigned to the assignee of the present invention. The energy recovery device consists of an engine core having a plurality of elongated wires arranged in a bundle type configuration or closely packed together. It is desirable to translate the contraction of the SMA or NTE wire material into a mechanical force in an efficient manner. SMA material exhibits a complex stress-strain-temperature relationship. Typically a combination of stress and temperature are involved in the transformation of the SMA material from its 'de-twinned' martensite phase to austenite phase.

When there is a load on the wire during its fully martensitic (or fully austenitic) phase, it strains according to the Young Modulus. The austenitic and twined martensite states happen naturally in the wire even if no external stress is applied. A drawback of an unloaded shape memory alloy being the fact that the wire is not obtaining any specific deflection and the transition happens only based on a temperature difference. In order to obtain a useful output from the wire cycling one has to apply a stress to it. The magnitude of the stress depends on the desired deformation. By applying a stress to the wire in order to make it react can be detrimental to its fatigue life, which results in engine core failure.

US Patent Publication Number US2011/179790 (Pretorius) describes a number of different embodiments with renewable and mechanical arrangements that enable the phase change of the shape memory alloy, i.e. from martensite to austenite and reverse, by applying a force while the alloy is in its soft state, martensite and heating it up to return it to austenite, hence developing a force return. UK patent publication number GB2,533,357 (Exergyn) deals with utilising a core to provide the force to return the material in its extended martensite state and a spring to damp any deviations in a smooth operation in an antagonistic arrangement.

It is therefore an object to provide an improved system and method for ensuring a longer fatigue life of a SMA or NTE engine core for use in an energy recovery device.

SUMMARY

According to the invention there is provided, as set out in the appended claims, an energy recovery device comprising:
- a drive mechanism;
- an engine core comprising a plurality of elongated Shape Memory Alloy (SMA) elements or Negative Thermal Expansion (NTE) elements fixed at a first end and connected at a second end to the drive mechanism;
- characterised in that a block mechanism is positioned between the engine core and the drive mechanism to restrict movement of the drive mechanism until the elements are preheated to a desired temperature.

The invention solves the problem of unequal engagement of the wires due to the dependency on the fill of the chamber the wire/wires is/are in. The uneven engagement poses problems of overloading the wire and damaging the internal structure of the material. The invention provides a protection mechanism for long fatigue life of the wires involving hysteresis manipulation of the core, by decoupling the intrinsic dependency of temperature and stress. By understanding the movements of the material hysteresis and the manipulation of the inherent material properties can be used to prevent the over-stressing of the alloy due to unequal activation. The invention describes embodiments to prevent the free movement of the alloy when it has reached transformation temperatures, in order to avoid portions of the material to experience a stress level detrimental to a long fatigue life. The present invention provides a method to enhance the fatigue life of the alloy for a cycling regime in an engine core comprising a plurality of elongated SMA wires arranged in a bundle arrangement.

In one embodiment the block mechanism is adjustable.

In one embodiment the block mechanism is configured to operate between an open and closed position between different cycles of operation.

In one embodiment the block mechanism comprises a physical stop adapted to prevent excessive elongation during the Shape Memory Alloy (SMA) elements or Negative Thermal Expansion (NTE) elements during a cold cycle.

In one embodiment the block mechanism provides a temperature control on a hot cycle when the Shape Memory Alloy (SMA) elements or Negative Thermal Expansion (NTE) elements are heated.

In one embodiment there is provided a hysteresis loop defining a hot and a cold cycle of the Shape Memory Alloy (SMA) elements or Negative Thermal Expansion (NTE) elements is controlled by said block mechanism.

In one embodiment movement of the drive mechanism is blocked when the activation temperature on a hot cycle is rising to a level to which the temperature of the hot stream is no longer enough to achieve Shape Memory Alloy (SMA) elements or Negative Thermal Expansion (NTE) element activation, such that the element is protected and overstressing of the internal structure of the element is prevented.

In one embodiment the plurality of Shape Memory Alloy (SMAs) or Negative Thermal Expansion (NTE) elements are arranged as a plurality of wires positioned substantially parallel with each other to define a core.

In a further embodiment there is provided an energy recovery device comprising:
  a drive mechanism;
  an engine core comprising an elongated Shape Memory Alloy (SMA) elements or Negative Thermal Expansion (NTE) element fixed at a first end and connected at a second end to the drive mechanism;
  characterised in that a block mechanism is positioned between the engine core and the drive mechanism to restrict movement of the drive mechanism until the element is preheated to a desired temperature.

In another embodiment there is provided a method of energy recovery comprising the steps of An energy recovery device comprising:
  arranging a plurality of elongated Shape Memory Alloy (SMA) elements or Negative Thermal Expansion (NTE) elements to define a core fixed at a first end and connected at a second end to a drive mechanism;
  positioning a block mechanism is positioned between the engine core and the drive mechanism to restrict movement of the drive mechanism until the elements reach a desired temperature.

BRIEF DESCRIPTION OF THE DRAWINGS

The invention will be more clearly understood from the following description of an embodiment thereof, given by way of example only, with reference to the accompanying drawings, in which:—

FIG. 1 illustrates known stress—temperature dependency in shape memory alloys;

FIG. 2 illustrates a hysteresis loop at a constant stress;

FIG. 3 illustrates two hysteresis loops at two different stresses;

FIG. 4 illustrates a resultant cycle for an energy recovery device incorporating a NTE or SMA wire material engine core;

FIG. 8 illustrates the hysteresis manipulation of the wires to improve fatigue life (wire segmented view) and the influence on temperature when piston's movement is blocked;

DETAILED DESCRIPTION OF THE DRAWINGS

The invention relates to the optimum cycling of wires for use in a heat recovery system which can use either Shape Memory Alloys (SMAs) or other Negative Thermal Expansion materials (NTE) to generate power from a heated fluid.

Such an energy recovery device is described in PCT Patent Publication number WO2013/087490, assigned to the assignee of the present invention, and is incorporated fully herein by reference.

For such an application, the contraction of such material on exposure to a heat source is captured and converted to usable mechanical work. A useful material for the working element of such an engine has been proven to be Nickel-Titanium alloy (NiTi). This alloy is a well-known Shape-Memory Alloy and has numerous uses across different industries. It will be appreciated that any suitable SMA or NTE material can be used in the context of the present invention.

Force is generated through the contraction and expansion of this alloy (presented as a plurality of wires) within the working core, via a piston and transmission mechanism. An important aspect of the system is that a reliable assembly is created, enabling high-force, low displacement work to be performed for a maximum number of working cycles. Accordingly, depending on the requirements of a particular configuration and the mass of SMA material needed a plurality of elongated SMA wires may be employed together, spaced substantially parallel to each other, to form a single core.

In such a single engine core a number of rods/wires are held together in a bundle. The wires are continually placed under stress and temperature change during operation. FIG. 1 illustrates a known stress—temperature dependency in shape memory alloys. At constant stress the wire hysteresis is illustrated in FIG. 2. The loop is defined by the activation temperatures that are dependent of the stress regime the wire is subjected to. The hysteresis loops shift up if a higher stress is applied. The activation temperatures are higher for a higher stress level, as shown in FIG. 3. In order to capture the work window of a dual loading cycle with a small load applied on the cold cycle and a high load on applied during the hot cycle, one has to take into consideration the hysteresis movement, as shown FIG. 4.

Taking into consideration the activation temperatures and the fact that the wires are exposed to high stress levels for a targeted output to be obtained the fatigue life of the wire is shortened.

Figure 5:
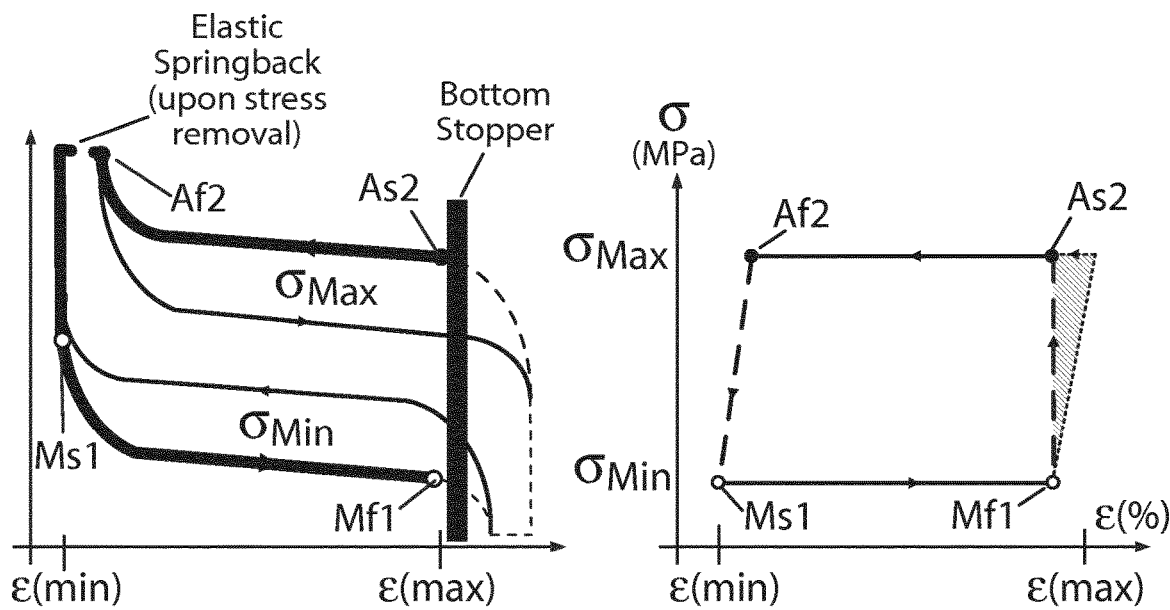
FIG. 5 illustrates a physical stop preventing excessive elongation of an engine core during a cold cycle according a first embodiment of the invention.
Figure 6:
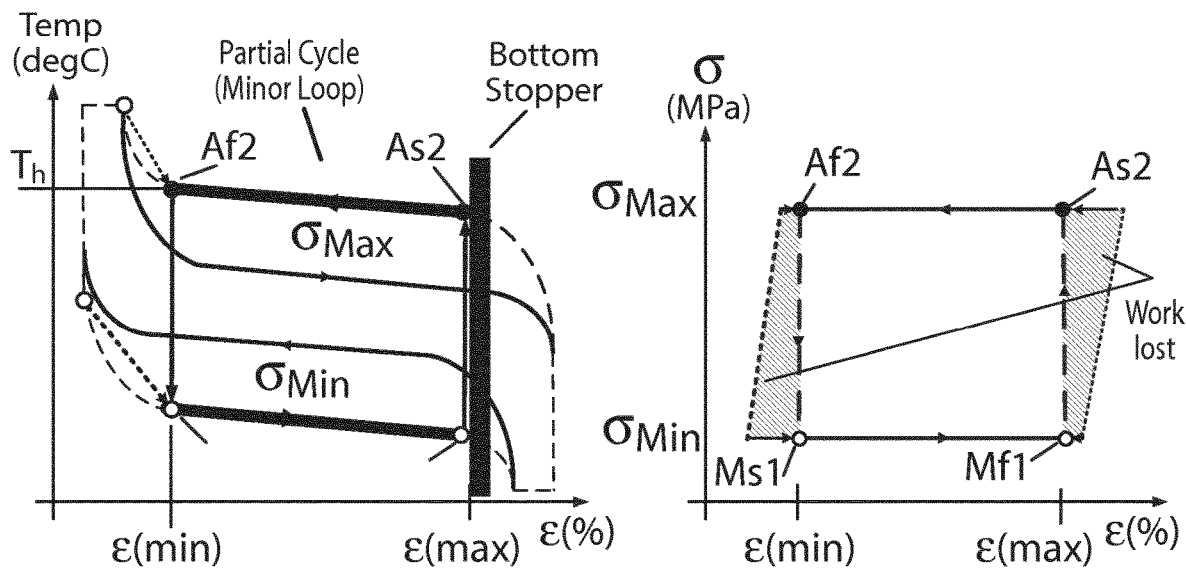
FIG. 6 illustrates a physical stop preventing the excessive elongation during a cold cycle and temperature control on the hot side according to one embodiment of the invention.

According to a first embodiment of the invention a physical stop mechanism is placed on the cold cycle so that the wire cannot elongate the full length and subsequently the internal structure is not going to be overstressed and no defects (internal/surface cracks that would lead to a premature failure) can be embedded in the material. FIG. 5 illustrates a physical stop preventing the excessive elongation during the cold cycle. FIG. 6 illustrates a physical stop preventing the excessive elongation during the cold cycle and temperature control on the hot side.

In terms of temperature control, the deflection is limited because the wire is not achieving its absolute maximum potential for deformation. This is another possible form of protection because the decay in performance due to cumulative permanent deformation during cycling is diminished, but not completely eliminated.

In order to limit the deflection of the wire and to ensure a uniform engagement of the material and prevent any overloading on length, when the wire is not ready to undertake a superior loading regime. The following solution is provided by the placement of stops under and over the piston (attached to the wire). The block mechanism can be, but is not limited as, a form of clamps that are not allowing the piston to move in reaction to the deformation of the material during the hot and/or cold cycles. The only condition that must be satisfied by the block mechanism is that the top clamps should be fully controllable and able to move in and out of a closed and open position as required (release or restrain the piston) and the bottom clamps have to be able to stay in the closed position, but said position has to be able to be adjusted in the case of more deformation needed to be obtained on the cold cycle (movement on the axis of the piston).

Figure 7:
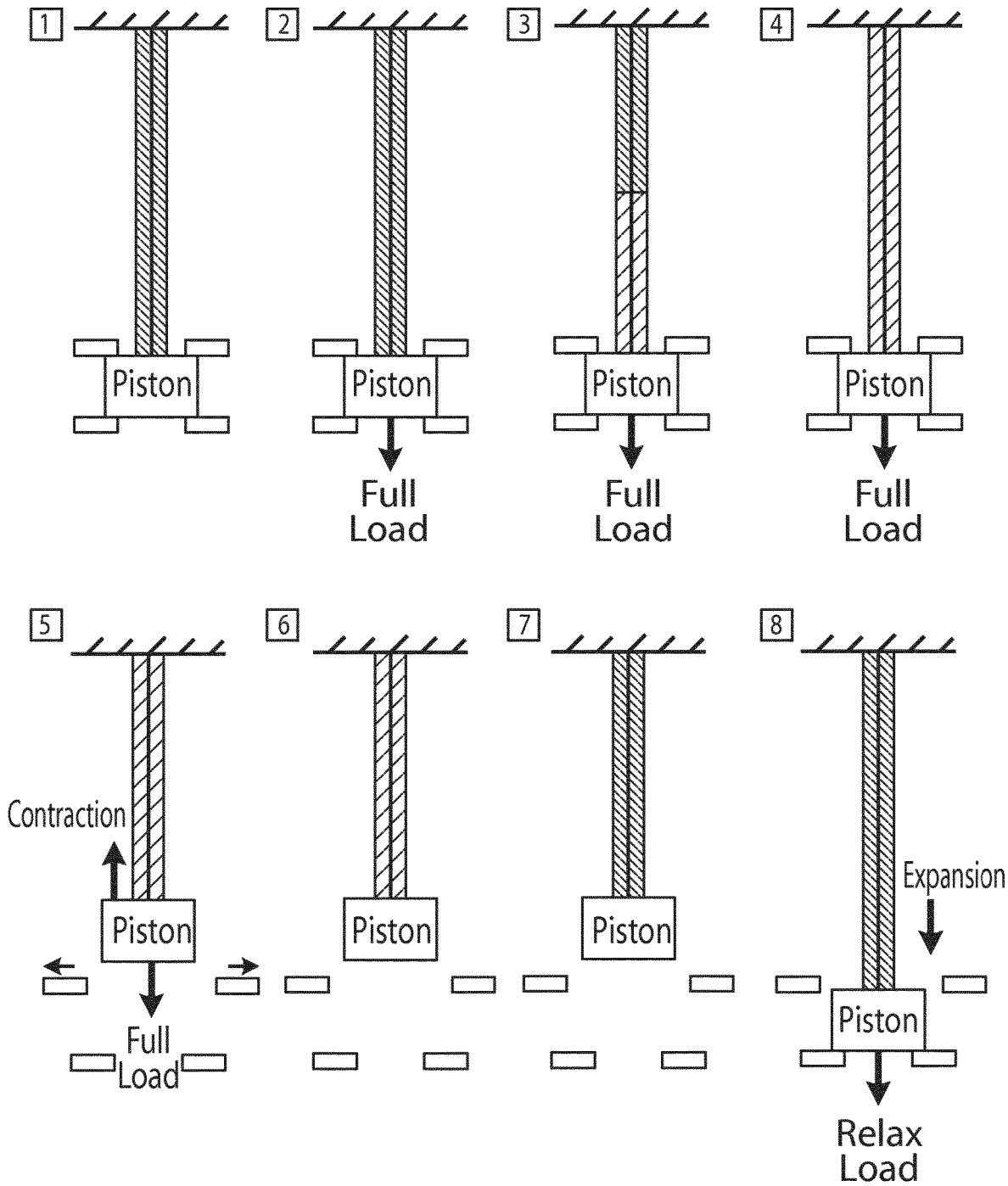
FIG. 7 illustrates operation of the stop mechanism to enable hysteresis of the core to improve fatigue life.

FIG. 7 illustrates operation of the stop mechanism to enable hysteresis of the core to improve fatigue life. In FIG. 7 a wire, representing an engine core, comprises a controlled deflection under low load when exposed to cold water by placing a stop under the piston is shown as position 1. In this illustration a single NTE or SMA wire is shown, but in practice the core can be made up of a plurality of wires to define a single core. Position 2 shows the wire is in fully extended position the piston is blocked on the top part and the full load is applied. Due to the fact that the piston is sitting on a physical stop the wire is prevented to elongate more when exposed to a higher load. Positions 3 and 4 show that the hot water is fed onto the wire while in fully blocked position. Due to the fact that the wire is prevented from moving the hysteresis shifts up and the hot water temperature becomes insufficient to make the wire react. This provides a preservation of the wire by the manipulation of the hysteresis. In this way through a perceived overloading, the wire is actually incapable of reacting because its activation temperatures are too high for the water/fluid to fulfil its purpose of reverting the material to its austenitic form (decoupling of stress and temperature relationship). When the material is fully heated, as shown in Position 5, the 'stop' constraint is released (the upper stop) and the wire is allowed to contract in Position 6. The cycle is restarted in Position 7 when the cold fluid is flowing on top of the material and the relaxation stage is commencing under the low load as shown in Position 8.

In order to further optimise the working cycle, the temperature/stress dependency can be monitored and the fluid temperatures can be decreased in such a way that the activation of the alloy is prevented in overloading conditions, but there is no overheating and thus inefficient usage of the potential in the fluid.

FIG. 8 illustrates the hysteresis manipulation of the wires to improve fatigue life (wire segmented view) and the influence on temperature when piston's movement is blocked. As shown in FIG. 8 when the piston's movement is blocked the activation temperature on the hot side is rising to a level to which the temperature of the hot stream is no longer enough to achieve the wire activation. In this way the wire is protected and the overstressing of the internal structure of the material is prevented.

Figure 9:
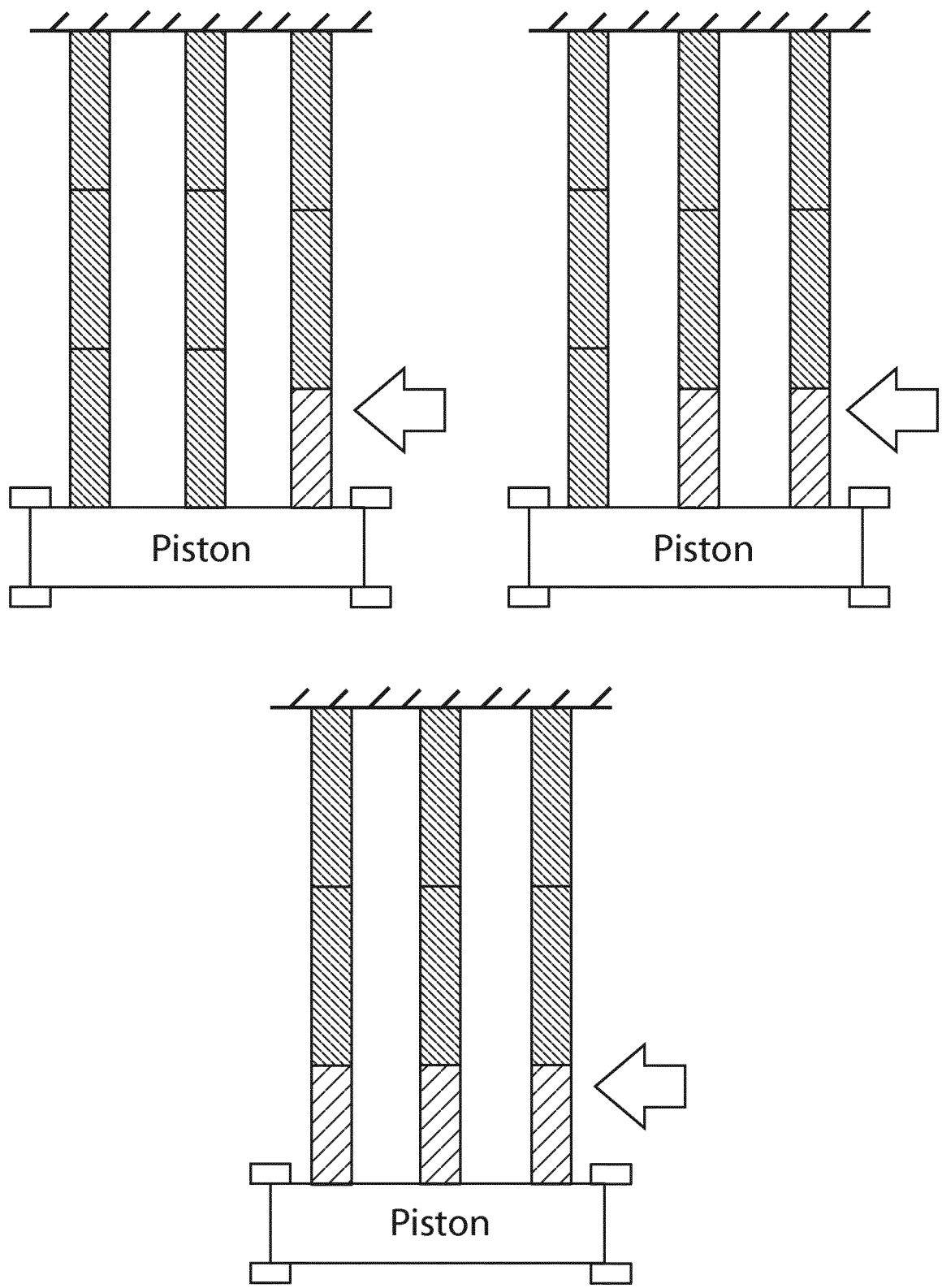
FIG. 9 illustrates segmented engagement of the wires in a three wire bundle arrangement.
Figure 10:
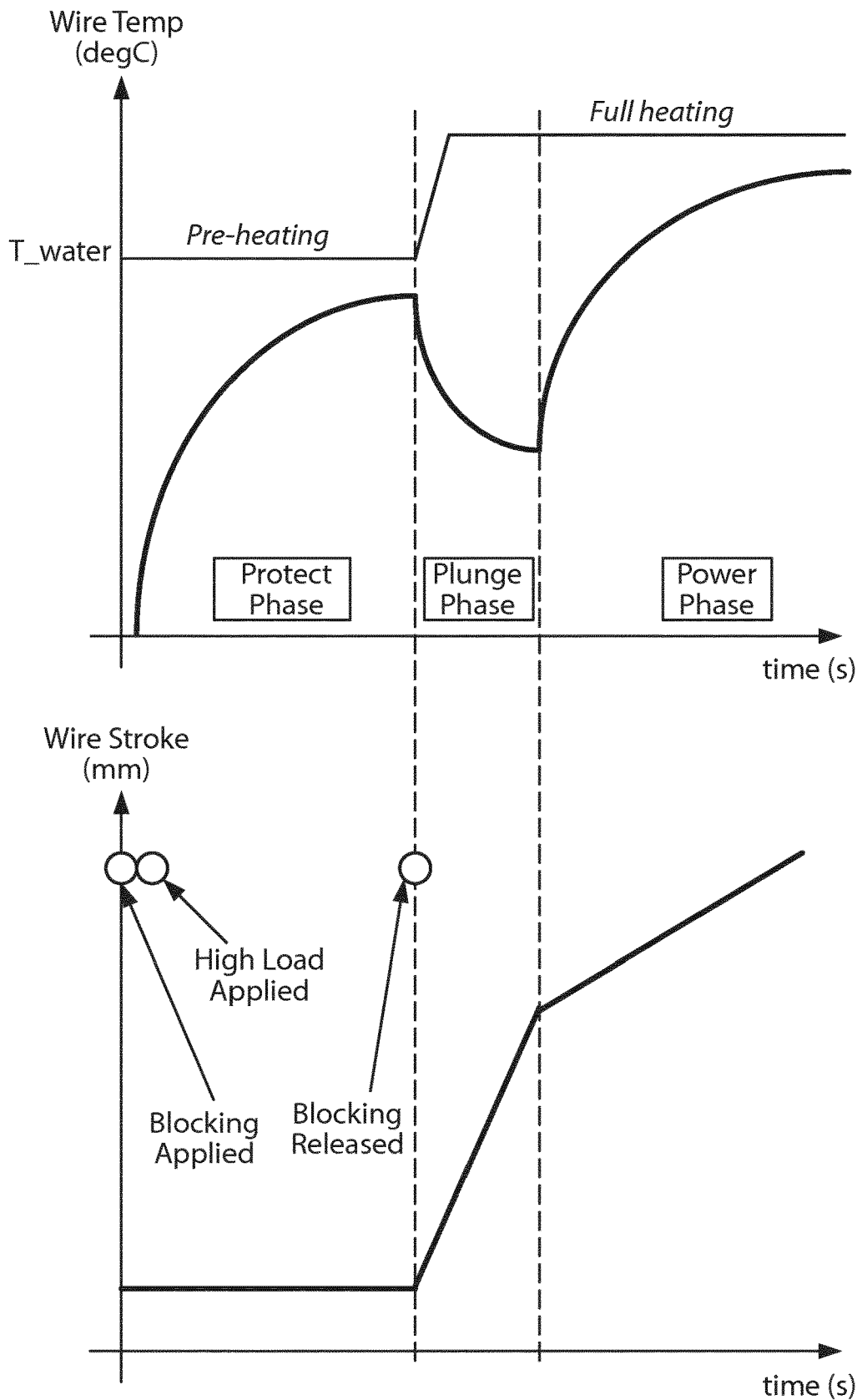
FIG. 10 illustrates a hot cycle schematic for wire temperature and movement.
Figure 11:
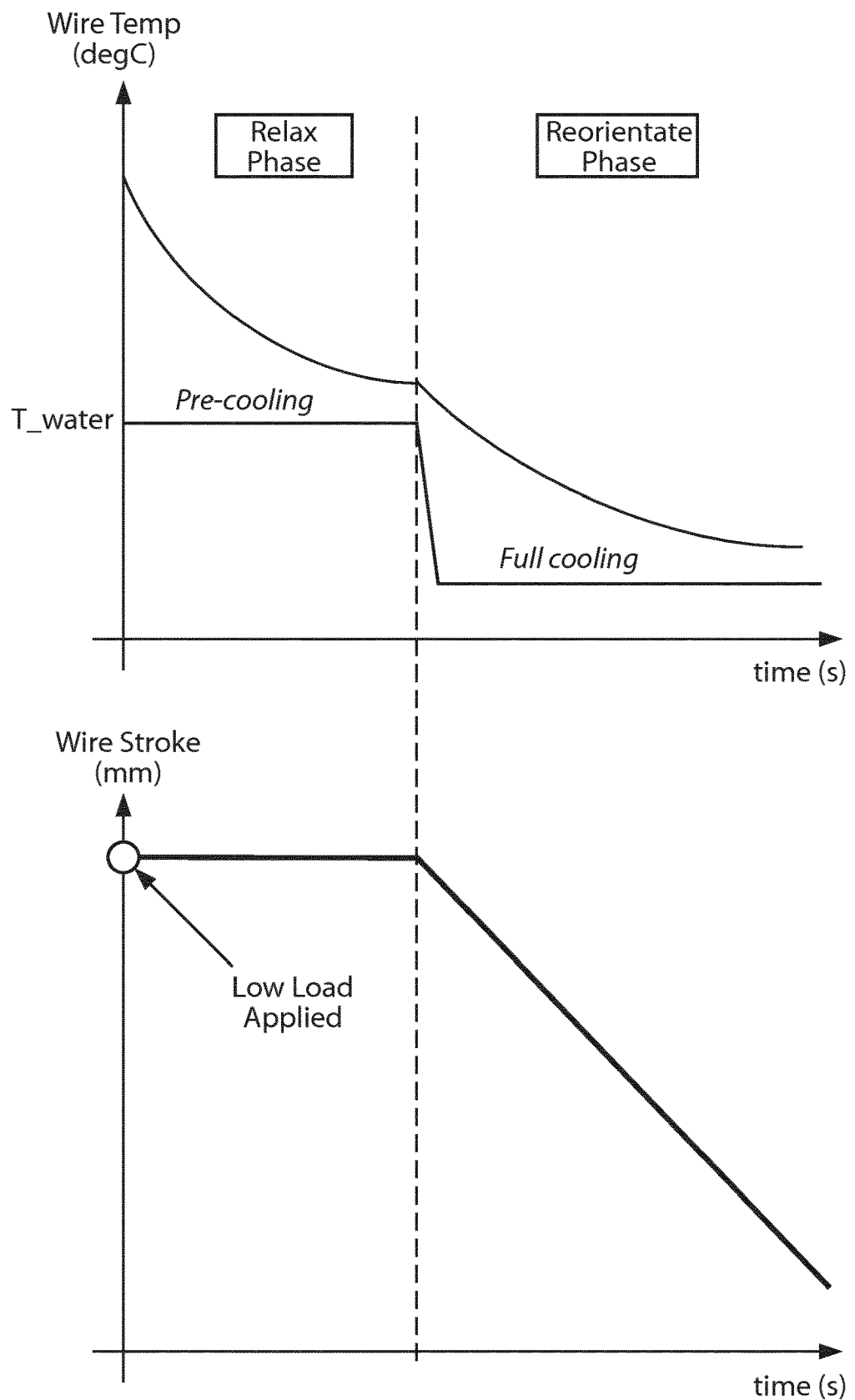
FIG. 11 illustrates a cold cycle schematic for wire temperature and movement.

FIG. 9 illustrates segmented engagement of the wires on a three wire bundle arrangement. FIG. 9 shows how the piston blocking is protecting the wires in a bundle from being overstressed by uneven activation during use. Once all the wires are at an even temperature the blocking mechanism can be released so that the piston is actuated without overstressing the wires. FIG. 10 illustrates a hot cycle schematic for wire temperature and movement. In a preheating step the SMA wires are restricted and cannot move. A hysteresis manipulation scenario is presented with piston movement restriction. Once the temperature reaches a desired temperature the blocking mechanism is released and the expansion of the wires actuates the piston. Initially there is a plunge phase and the wires rapidly transfer to a power phase as shown in FIG. 10. FIG. 11 illustrates a cold cycle schematic for wire temperature and movement where a pre-cooling and cooling stages are shown and is the reverse cycle of FIG. 10.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. An energy recovery device comprising:
a drive mechanism;
an engine core comprising a plurality of elongated Shape Memory Alloy (SMA) elements or Negative Thermal Expansion (NTE) elements fixed at a first end and connected at a second end to the drive mechanism; and
a block mechanism positioned between the engine core and the drive mechanism to restrict movement of the drive mechanism until the elements reach a desired state, wherein the block mechanism is configured to provide a state control on a hot cycle when the Shape Memory Alloy (SMA) elements or Negative Thermal Expansion (NTE) elements are heated.

2. The energy recovery device as claimed in claim 1 wherein the block mechanism is adjustable.

3. The energy recovery device as claimed in claim 1 wherein the block mechanism is configured to move between an open and a closed position dependent on the temperature of the Shape Memory Alloy (SMA) elements or Negative Thermal Expansion (NTE) elements.

4. The energy recovery device as claimed in claim 1 wherein the block mechanism comprises a physical stop adapted to prevent excessive elongation during the Shape Memory Alloy (SMA) elements or Negative Thermal Expansion (NTE) elements during a cold cycle.

5. A method of energy recovery comprising the steps of an energy recovery device comprising:
arranging a plurality of elongated Shape Memory Alloy (SMA) elements or Negative Thermal Expansion (NTE) elements to define an engine core fixed at a first end and connected at a second end to a drive mechanism; and
positioning a block mechanism between the engine core and the drive mechanism to restrict movement of the drive mechanism until the elements reach a desired state, wherein the block mechanism is configured to provide a state control on a hot cycle when the Shape Memory Alloy (SMA) elements or Negative Thermal Expansion (NTE) elements are heated.

6. An energy recovery device comprising:
a drive mechanism;
an engine core comprising a plurality of elongated Shape Memory Alloy (SMA) elements or Negative Thermal Expansion (NTE) elements fixed at a first end and connected at a second end to the drive mechanism; and a block mechanism positioned between the engine core and the drive mechanism to restrict movement of the drive mechanism until the elements reach a desired state, wherein the block mechanism is configured to control a hysteresis loop defining a hot and a cold cycle of the Shape Memory Alloy (SMA) elements or Negative Thermal Expansion (NTE) elements.

7. An energy recovery device comprising:
a drive mechanism;
an engine core comprising a plurality of elongated Shape Memory Alloy (SMA) elements or Negative Thermal Expansion (NTE) elements fixed at a first end and connected at a second end to the drive mechanism; and
a block mechanism positioned between the engine core and the drive mechanism to restrict movement of the drive mechanism until the elements reach a desired state wherein movement of the drive mechanism is blocked when an activation temperature on a hot cycle is rising to a level to which the temperature is no longer enough to achieve Shape Memory Alloy (SMA) element or Negative Thermal Expansion (NTE) element activation, and wherein each element is protected and overstressing of the internal structure of each element is prevented.

8. A method of energy recovery comprising the steps of an energy recovery device comprising:
arranging a plurality of elongated Shape Memory Alloy (SMA) elements or Negative Thermal Expansion (NTE) elements to define an engine core fixed at a first end and connected at a second end to a drive mechanism; and
positioning a block mechanism between the engine core and the drive mechanism to restrict movement of the drive mechanism until the elements reach a desired state, wherein the block mechanism is configured to control a hysteresis loop defining a hot and a cold cycle of the Shape Memory Alloy (SMA) elements or Negative Thermal Expansion (NTE) elements.

9. A method of energy recovery comprising the steps of an energy recovery device comprising:
arranging a plurality of elongated Shape Memory Alloy (SMA) elements or Negative Thermal Expansion (NTE) elements to define an engine core fixed at a first end and connected at a second end to a drive mechanism; and
positioning a block mechanism between the engine core and the drive mechanism to restrict movement of the drive mechanism until the elements reach a desired state, wherein movement of the drive mechanism is blocked when an activation temperature on a hot cycle is rising to a level to which temperature is no longer enough to achieve Shape Memory Alloy (SMA) element or Negative Thermal Expansion (NTE) element activation, and wherein each element is protected and overstressing of the internal structure of each element is prevented.

* * * * *